(12) United States Patent
Lin

(10) Patent No.: US 10,880,536 B2
(45) Date of Patent: Dec. 29, 2020

(54) THREE-DIMENSIONAL IMAGE CAPTURING DEVICE AND METHOD

(71) Applicant: GOERTEK TECHNOLOGY CO.,LTD., Qingdao (CN)

(72) Inventor: Chingshun Lin, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/309,376

(22) PCT Filed: Oct. 31, 2017

(86) PCT No.: PCT/CN2017/108664
§ 371 (c)(1),
(2) Date: Dec. 12, 2018

(87) PCT Pub. No.: WO2019/061650
PCT Pub. Date: Apr. 4, 2019

(65) Prior Publication Data
US 2019/0230340 A1    Jul. 25, 2019

(30) Foreign Application Priority Data

Sep. 29, 2017 (CN) .......................... 2017 1 0908242

(51) Int. Cl.
*H04N 13/239*    (2018.01)
*G03B 35/10*    (2006.01)
(Continued)

(52) U.S. Cl.
CPC ........... *H04N 13/239* (2018.05); *G02B 7/102* (2013.01); *G03B 17/12* (2013.01); *G03B 35/08* (2013.01);
(Continued)

(58) Field of Classification Search
CPC .. H04N 13/239; H04N 5/23287; G03B 35/08; G03B 35/10
See application file for complete search history.

(56) References Cited

U.S. PATENT DOCUMENTS 4,881,122 A * 11/1989 Murakami ........... H04N 13/239
348/47
5,715,489 A * 2/1998 Inaba ..................... G03B 35/10
396/327
(Continued)

FOREIGN PATENT DOCUMENTS

CN    101419391 A    4/2009
CN    101840146 A    9/2010
(Continued)

OTHER PUBLICATIONS

NPL Google search; 2019. (Year: 2019).*
(Continued)

*Primary Examiner* — Luis Perez-Fuentes
(74) *Attorney, Agent, or Firm* — Maschoff Brennan

(57) ABSTRACT

Provided are a three-dimensional image capturing device and a method. The device includes: a first lens module and a second lens module, and an adjustable mechanism connecting the first lens module and the second lens module respectively. The adjustable mechanism is capable of changing a lens interval between the first lens module and the second lens module; and a processing apparatus connected to the first lens module and the second lens module, configured to determine a capturing interval between the three-dimensional image capturing device and a target capturing object, determine a target lens interval corresponding to the capturing interval; control the adjustable mechanism to adjust an interval between the first lens module and second lens module to be the target lens interval, and capture a three-dimensional of the target capturing object by using
(Continued)

first lens module and second lens module, which enlarges the capturing range of three-dimensional image capturing device.

12 Claims, 2 Drawing Sheets

(51) Int. Cl.
  G02B 7/10 (2006.01)
  G03B 17/12 (2006.01)
  G03B 35/08 (2006.01)
  H04N 5/77 (2006.01)
  H04N 5/232 (2006.01)
(52) U.S. Cl.
  CPC ............ *G03B 35/10* (2013.01); *H04N 5/232* (2013.01); *H04N 5/77* (2013.01)

(56) References Cited

U.S. PATENT DOCUMENTS

| | | | | |
|---|---|---|---|---|
| 5,778,268 A * | 7/1998 | Inaba | ............ | G03B 35/10 |
| | | | | 396/326 |
| 6,144,809 A * | 11/2000 | Inaba | ............ | G03B 35/10 |
| | | | | 396/326 |
| 6,507,359 B1 * | 1/2003 | Muramoto | ............ | H04N 5/772 |
| | | | | 348/47 |
| 6,701,081 B1 * | 3/2004 | Dwyer | ............ | G03B 41/00 |
| | | | | 396/329 |
| 9,167,229 B2 * | 10/2015 | Bang | ............ | H04N 13/204 |
| 9,491,439 B2 * | 11/2016 | Ogura | ............ | H04N 5/23287 |
| 9,699,441 B2 | 7/2017 | Inaba | | |
| 2009/0109235 A1 | 4/2009 | Lin | | |
| 2009/0309959 A1 * | 12/2009 | Iwai | ............ | G03B 21/005 |
| | | | | 348/54 |
| 2011/0001797 A1 * | 1/2011 | Cookson | ............ | H04N 13/296 |
| | | | | 348/47 |
| 2011/0001798 A1 * | 1/2011 | Cookson | ............ | G03B 35/00 |
| | | | | 348/47 |
| 2012/0236124 A1 | 9/2012 | Aoki | | |
| 2012/0257024 A1 | 10/2012 | Ianba | | |
| 2013/0076870 A1 * | 3/2013 | Kitzen | ............ | H04N 13/246 |
| | | | | 348/49 |
| 2014/0132738 A1 * | 5/2014 | Ogura | ............ | H04N 5/23287 |
| | | | | 348/47 |
| 2017/0134715 A1 | 5/2017 | Chen | | |

FOREIGN PATENT DOCUMENTS

| | | |
|---|---|---|
| CN | 102640049 A | 8/2012 |
| CN | 104883560 A | 9/2015 |
| CN | 105571495 A | 5/2016 |
| CN | 106507087 A | 3/2017 |
| CN | 106961594 A | 7/2017 |
| EP | 2 508 946 A1 | 10/2012 |
| EP | 3 310 046 A1 | 4/2018 |
| JP | H05-197045 A | 8/1993 |

OTHER PUBLICATIONS

NPL Google Search; 2020 (Year: 2020).*
CN Office Action dated Sep. 18, 2018 as received in Application No. 201710908242.4.

* cited by examiner

THREE-DIMENSIONAL IMAGE CAPTURING DEVICE AND METHOD

CROSS REFERENCE TO RELATED APPLICATION

This application is a national stage of International Application No. PCT/CN2017/108664, filed on Oct. 31, 2017, which claims priority to Chinese Patent Application No. 2017109082424, filed on Sep. 29, 2017. Both of the aforementioned applications are hereby incorporated by reference in their entireties.

TECHNICAL FIELD

The present application relates to the field of electronic device technology, and in particular, to a three-dimensional image capturing device and method.

BACKGROUND

A three-dimensional image capturing device refers to a camera manufactured by using 3D lenses. Usually, there are two or more camera lenses. An interval distance between the two camera lenses is similar to an interval distance between the human eyes. The three-dimensional image capturing device can shoot a stereoscopic image of the same scene viewed by the human eyes, to provide an immersive viewing experience for a user.

In the prior art, the interval between the two camera lenses of the 3D camera is fixed and similar to the interval of the human eyes, so as to simulate the human eyes for shooting. Therefore, a shooting range of the 3D camera is similar to a viewing range of the human eyes. For example, the best viewing effect of the human eyes for viewing a target is 0.7 m (meter) to 5 m (meter), and the 3D camera should also be disposed in this range when shooting the same target.

As can be seen from above description, since an interval between lenses of the 3D camera is fixed, the 3D camera can only shoot the shooting target within a fixed distance, resulting in a limited usage.

SUMMARY

In view of this, there is provided in the present disclosure a three-dimensional image capturing device and a three-dimensional image capturing method to solve the technical problem that the shooting angle of the 3D camera in the prior art is fixed to a corresponding time interval, and the shooting range is limited in the shooting range.

In order to solve above technical problem, there is provided in the present disclosure a three-dimensional image capturing device, including a first lens module and a second lens module, where the device further includes:

an adjustable mechanism connecting the first lens module and the second lens module respectively; where the adjustable mechanism is capable of changing a lens interval between the first lens module and the second lens module; and a processing apparatus connected to the first lens module and the second lens module, and configured to determine a capturing interval between the three-dimensional image capturing device and a target capturing object, determine a target lens interval corresponding to the capturing interval; control the adjustable mechanism to adjust the lens interval between the first lens module and the second lens module to be the target lens interval, and capture and obtain a three-dimensional of the target capturing object by using the first lens module and the second lens module.

Optionally, the device further includes a driving motor mounted on the adjustable mechanism and connected to the processing apparatus; where the driving motor is configured to adjust the lens interval between the first lens module and the second lens module to be the target lens interval under a control of the processing apparatus.

Optionally, the driving motor includes a telescopic shaft, and a rolling shaft connected to the telescopic shaft; the adjustable mechanism further includes a first bracket connected to a first end of the telescopic shaft, and a second bracket connected to a second end of the telescopic shaft; where the first bracket is connected to the first lens module, and the second bracket is connected to the second lens module; and the rolling shaft is further connected to the processing apparatus to cause the processing apparatus to control the rolling shaft to roll on the telescopic shaft to change the lens interval between the first lens module and the second lens module.

Optionally, the processing apparatus controls the driving motor of the adjustable mechanism to adjust the lens interval between the first lens module and the second lens module to be the target lens interval includes:

determining a number of moving steps of the driving motor according to the target lens interval; and controlling the driving motor on the adjustable mechanism to move according to the moving steps, to adjust the lens interval between the first lens module and the second lens module to be the target lens interval.

Optionally, the first lens module includes a first lens and a first lens motor connected to the first lens, and the second lens module includes a second lens and a second lens motor connected to the second lens; where the first lens motor is operated to adjust an aperture of the first lens; and the second lens motor is operated to adjust an aperture of the second lens;

the processing apparatus is further configured to:

determine a target number of the motor steps when the first lens and the second lens are in an optimal focus state; and adjust the first lens motor and the second lens motor to be the target number of the motor steps respectively.

Optionally, the determining by the processing apparatus the capturing interval between the three-dimensional image capturing device and the target capturing object includes:

determining the target number of the motor steps and a focal length when the first lens and the second lens are in the optimal focus state;

calculating a product of a difference between the target number of the motor steps and a maximum number of motor steps, a moving distance for each motor step, and a lens magnification;

calculating a sum of the product and the focal length to obtain an image distance; and calculating and obtaining an object distance according to the image distance, the focal length, and a Gaussian imaging formula, where the object distance is the capturing interval between the three-dimensional image capturing device and the target capturing object In a second aspect, the present disclosure further provides a three-dimensional image capturing method, applied in a three-dimensional image capturing device, where the method includes:

determining a capturing interval between the three-dimensional image capturing device and a target capturing object;

determining a target lens interval corresponding to the capturing interval;

controlling an adjustable mechanism to adjust a lens interval between a first lens module and a second lens module to be the target lens interval; where the first lens module and the second lens module are respectively connected to the adjustable mechanism, to adjust a lens interval between the first lens module and the second lens module through the adjustable mechanism; and capturing a three-dimensional image of the target capturing object by using the first lens module and the second lens module.

Optionally, the controlling the adjustable mechanism to adjust a lens interval between the first lens module and the second lens module to be the target lens interval includes:

controlling a driving motor of the adjustable mechanism to adjust a lens interval between the first lens module and the second lens module to be the target lens interval; where the driving motor is located on the adjustable mechanism and is connected to the processing apparatus.

Optionally, the method further includes:

controlling a rolling shaft of the driving motor to roll on a telescopic shaft to adjust the lens interval between the first lens module and the second lens module; where the telescopic shaft and the rolling shaft connected to the telescopic shaft are located in the driving motor, a first end of the telescopic shaft is connected to a first bracket of the adjustable mechanism, and a second end of the telescopic shaft is connected to a second bracket of the adjustable mechanism; and the first bracket is connected to a first lens module, and the second bracket is connected to a second lens module.

Optionally, the controlling the driving motor of the adjustable mechanism to adjust the lens interval between the first lens module and the second lens module to be the target lens interval includes:

determining a number of moving steps of the driving motor according to the target lens interval;

controlling the driving motor on the adjustable mechanism to move in accordance with the number of the moving steps to adjust the lens interval between the first lens module and the second lens module to be the target lens interval.

Optionally, the method further includes:

determining a target number of motor steps when the first lens and the second lens are in an optimal focus state; and adjusting the first lens motor and the second lens motor respectively to the target number of the motor steps;

where the first lens motor and the first lens are located in the first lens module, the first lens motor operates to adjust an aperture of the first lens, the second lens motor and the second lens are located in the second lens module, and the second lens motor operates to adjust an aperture of the second lens.

Optionally, the determining the capturing interval between the three-dimensional image capturing device and the target capturing object includes:

determining the target number of the motor steps and a focal length when the first lens and the second lens are in the optimal focus state;

calculating a product of a difference between the target number of the motor steps and a maximum number of the motor steps, a moving distance for each motor step, and a lens magnification;

calculating a sum of the product and the focal length to obtain an image distance; and calculating and obtaining an object distance according to the image distance, the focal length, and a Gaussian imaging formula, where the object distance is the capturing interval between the three-dimensional image capturing device and the target capturing object.

In the embodiments of the present disclosure, the target lens interval between the first lens module and the second lens module may be determined according to the capturing interval between the three-dimensional image capturing device and the target object. By adjusting a module interval to be the target lens interval by the adjustable mechanism, the three-dimensional image of the target object may be captured by using the first lens module and the second lens module. The capturing interval changes as the change of a distance between the three-dimensional image capturing device and the target object, and the lens interval changes accordingly. A corresponding three-dimensional image can be captured when the capturing interval is different, an adjustable capturing interval of the three-dimensional image is achieved, and an available shooting range of the three-dimensional image device is enlarged and the usage thereof will not be limited any more.

DESCRIPTION OF EMBODIMENTS

Figure 1:
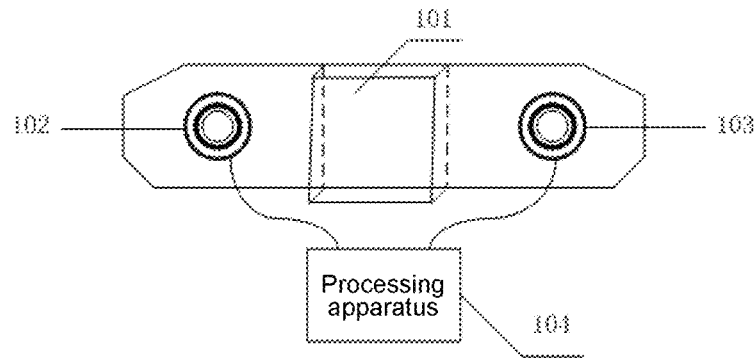
FIG. 1 is a schematic diagram of a structure of a three-dimensional image capturing device according to an embodiment of the present disclosure.

Implementations of the present disclosure will be described in detail below with reference to the accompanying drawings and embodiments, so that the implementation process of solving the technical problem by applying the technical means and achieving technical effect can be fully understood and implemented.

Embodiments of the present disclosure are mainly applied in a three-dimensional image capturing device, and provide an adjustable mechanism for the three-dimensional image capturing device to enlarge a shooting range of the three-dimensional image capturing device.

In the prior art, the three-dimensional image capturing device is a device that simulates an interval of the human eyes by using two camera lenses, which is able to shoot different images regarding the same scene by using the two camera lenses, and synthesizes the two images shot by the two camera lenses into a corresponding stereo image. Usually, the interval of the human eyes is 0.7 cm, and an optimal viewing range is 0.7 m (meter) to 5 m (meter) relative to the interval of the human eyes. Since the three-dimensional image capturing device usually simulates the interval of the human eyes by setting an interval between the two camera lenses to 0.7 cm, a corresponding optimal shooting range is 0.7 m (m) to 5 m (m), and the shot image taken in this range is much clearer. However, since the interval between the two camera lenses of the three-dimensional image capturing device is fixed to the interval of the human eyes, the shooting range of the three-dimensional image capturing device is fixed correspondingly, and the shooting range thereof is limited.

The inventor has found that an optical angle θ formed between the human eyes or the two camera lenses of the three-dimensional image capturing device and a target shooting object is about 0.72 degrees to 0.8 degrees, that is, the best viewing angle is 0.72 degrees to 0.8 degrees. Therefore, when the optical angle between the two camera lenses and the target shooting object satisfies the best viewing angle during the three-dimensional image capturing device when an image is captured, a clear three-dimensional image can be captured. A degree of the optical angle θ may be calculated and obtained by solving a triangle regarding the interval between the two camera lenses and a distance between the three-dimensional image capturing device and the target shooting object. That is to say, when the optical angle θ is stable, the interval between the two camera lenses is changed with a distance between the three-dimensional image capturing device and the target shooting object. The larger the interval between the two camera lenses is, the larger the distance between the three-dimensional image capturing device and the target shooting object is. Accordingly, the inventor proposed the technical solution of the present disclosure.

In the embodiments of the present disclosure, when the capturing interval between the three-dimensional image capturing device and a target capturing object is determined, a target lens interval corresponding to the capturing interval may be further determined. An adjustable mechanism is provided in the three-dimensional image capturing device to adjust a lens interval between the first lens module and the second lens module to be the target lens interval. Thereby, the target lens interval may change as the change of the capturing interval, to achieve a capturing work of the three-dimensional image of the capturing target at different capturing distances. Therefore, by the setting of the adjustable mechanism, an adjustable of the capturing range of the three-dimensional image capturing device is achieved, and the shooting range of the three-dimensional image capturing device is enlarged.

The embodiments of the present disclosure will be described in detail below with reference to the accompanying drawings.

FIG. 1 shows a schematic diagram of a structure of an embodiment of a three-dimensional image capturing device according to an embodiment of the present disclosure. The three-dimensional image collection device may include:

A first lens module 102 and a second lens module 103; an adjustable mechanism 101 connecting the first lens module 102 and the second lens module 103 respectively, where the adjustable mechanism is capable of changing a lens interval between the first lens module 120 and the second lens module 103; and a processing apparatus 104, connected to the first lens module 102 and the second lens module 103, and configured to determine a capturing interval between the three-dimensional image capturing device and a target capturing object; determine a target lens interval corresponding to the capturing interval; control the adjustable mechanism 101 to adjust an interval between the first lens module 102 and the second lens module 103 to be the target lens interval; and capture and obtain a three-dimensional regarding the target capturing object by using the first lens module 102 and the second lens module 103.

The adjustable mechanism 101 may be implemented in various implementations. As a possible implementation manner, the adjustable mechanism may be a telescopic apparatus, and the length of the telescopic apparatus may change accordingly. The telescopic apparatus may include a first panel, a second panel connected to the first panel, and an elastic assembly. A first surface of the first panel is provided with a first groove, a first end of the elastic assembly is connected at a first position of the first groove. A first surface of the second panel is provided with a second groove, and a second end of the elastic assembly is connected at a second position of the second groove, where the first surface of the first panel is opposite to the second surface of the second panel. When the elastic assembly is stretched, the length of the telescopic mechanism becomes longer, and thus a lens interval between the first lens module and the second lens module increases. When the elastic assembly is compressed, the length of the telescopic mechanism becomes shorter, and thus the lens interval between the first lens module and the second lens module decreases.

Optionally, the three-dimensional image capturing device may further include: a distance detection component. The determining, by the processing apparatus 104, the capturing interval between the three-dimensional image capturing device and the target capturing object may specifically be measuring the capturing interval between the three-dimensional image capturing device and the target object by the distance detection component of the three-dimensional image capturing device. The distance detection component may include an infrared range finder or an ultrasonic range finder.

Optionally, the infrared range finder may be installed in the three-dimensional image capturing device, and may include an infrared emitter and an infrared sensor, where the infrared emitter is configured to emit infrared rays as a distance measurement light source, the distance measurement light source is reflected by the target capturing object and then received by the infrared sensor. A processor of the infrared range finder may calculate the capturing interval between the three-dimensional image capturing device and the target capturing object according to a value such as the power of the received distance measurement light source.

Optionally, the ultrasonic range finder may be installed in the three-dimensional image capturing device, and may include an ultrasonic emitting apparatus and an ultrasonic receiving apparatus, where the ultrasonic emitting apparatus may emit continuous ultrasonic waves, which are reflected by the target capturing object after reached the target capturing object, and the reflected ultrasonic waves may be received by the ultrasonic receiving apparatus, so that ultrasonic range finder may determine the capturing interval between the three-dimensional image capturing device and the target capturing object according to a parameter such as a round trip time of the ultrasonic waves.

Optionally, the determining by the processing apparatus the target lens interval corresponding to the capturing interval may be calculated and obtained specifically by using $D=\alpha(p/10)$.

Where D is the target lens interval, P is the capturing interval, 10 is an estimated ratio between the capturing interval and the target lens interval, and α is a constant less than 1 and greater than 0. In practical applications, a value of α may be determined as needed. Since the optical angle θ formed between the two camera lenses of the three-dimensional image capturing device and the target object is between 0.72 degrees and 0.8 degrees, that is, the optimal viewing angle is 0.72 degrees to 0.8 degrees. When the lens interval is 0.7 cm, the optimal viewing range may be estimated as 0.7 m (meter) to 5 m (meter) regarding this lens interval. Therefore, the ratio between the capturing interval and the target lens interval may be estimated to be 10:1 by above manner. However, since the optimal viewing range may change correspondingly when the lens interval is determined, a constant α may be used to identify a range mapping relationship between the lens interval and the capturing interval.

Optionally, the first lens module 102 may at least include a first lens, and the second lens module 103 may at least include a second lens. The first lens and the second lens may be the same type of lens. As a possible implementation manner, the first lens and the second lens may be a wide-angle fisheye lens, where the wide-angle refers to a shooting angle of the fisheye lens is wider compared to a shooting angle of a general lens, which may ensure a view image with a larger range can be shot.

The capturing and obtaining, by the processing apparatus, a three-dimensional image of the capturing target using the first lens module 102 and the second lens module 103 may specifically be:

capturing a first image by using the first lens module 102;

capturing a second image by using the second lens module 103; and synthesizing the first image captured by the first lens module 102 and the second image captured by the second lens module 103 into the three-dimensional image of the shooting target.

In the embodiments of the present disclosure, the lens interval between the first lens module and the second lens module may be adjusted by the adjustable mechanism, to determine the capturing interval between the three-dimensional image capturing device and the target lens interval. The corresponding target lens interval can be determined according to the capturing interval, so as to control the adjustable mechanism to adjust the lens interval between the first lens module and the second lens module to be the target lens interval. The three-dimensional image of the target capturing object may be captured by using the first lens module and the second lens module. Any capturing interval between the three-dimensional image capturing device and the target capturing object can generate a corresponding target lens interval, thereby achieving the capturing of the three-dimensional image. Then the capturing range of the three-dimensional image capturing device can be enlarged, and clear and stable images can be captured at different capturing intervals.

As an embodiment, the three-dimensional image capturing device may further include a driving motor mounted on the adjustable mechanism and connected to the processing apparatus, where the driving motor is configured to adjust the interval between the first lens module and the second lens module to be the target lens interval under the control of the processing apparatus.

The adjusting by the adjustable mechanism a lens interval between the first lens module and the second lens module may be achieved by the driving motor. That is to say, the driving motor may adjust the lens interval between the first lens module and the second lens module under the control of the processing apparatus.

Optionally, the controlling by the processing apparatus the adjustable mechanism to adjust the interval between the first module and the second module to be the target lens interval may specifically be:

controlling by the processing apparatus the driving motor in the adjustable mechanism to adjust the interval between the first module and the second module to be the target lens interval.

The driving motor is connected to the processing apparatus to receive a control command sent by the processing apparatus, and to adjust the lens interval between the first lens module and the second lens module under the control of the processing apparatus.

In some embodiments, the driving motor may include a telescopic shaft and a rolling shaft connected to the telescopic shaft. The adjustable mechanism further includes a first bracket connected to a first end of the telescopic shaft, and a second bracket connected to a second end of the telescopic shaft, where the first bracket is connected to the first lens module and the second bracket is connected to the second lens module. The rolling shaft is further connected to the processing apparatus, so that the processing apparatus controls the rolling shaft to roll on the telescopic shaft, so as to adjust the lens interval between the first lens module and the second lens module.

A telescopic shaft may be included in the driving motor, and the length of the telescopic shaft may be changed. When the rolling shaft rolls on the telescopic shaft, the length of the telescopic shaft may be changed. As a possible implementation manner, the telescopic shaft and the rolling shaft may be connected by a way of a sawtooth, and the length of the telescopic shaft may be changed by rotating the rolling shaft on the telescopic shaft.

When the length of the telescopic shaft changes, the interval between the first bracket and the second bracket changes accordingly. A distance between the first lens module connected to the first bracket and the second lens module connected to the second bracket changes as the change of the distance between the two brackets, to achieve an adjustment of the lens interval between the first lens module and the second lens module. The first bracket and the second bracket are both apparatuses used for carrying or connecting the first lens module and the second lens module.

Figure 2:
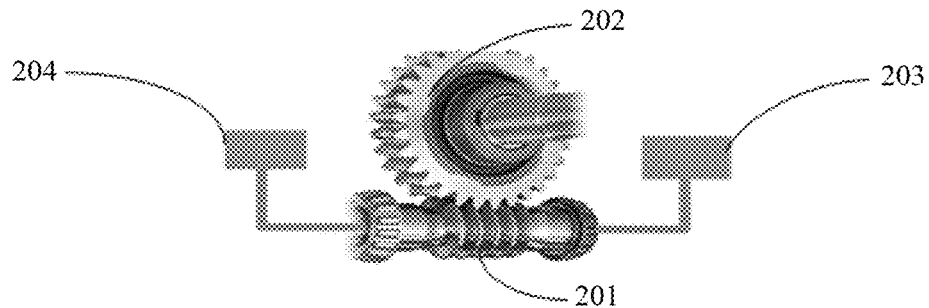
FIG. 2 is a schematic diagram of a structure of a driving motor according to an embodiment of the present disclosure.

FIG. 2 shows a schematic diagram of the telescopic shaft 201 and the rolling shaft 202 of the driving motor according to an embodiment of the present disclosure. The telescopic shaft 201 and the rolling shaft 202 are connected by the way of the sawtooth. The length of the telescopic shaft may be changed, when the rolling shaft 202 rolls on the telescoping shaft. In FIG. 2, the first end of the telescopic shaft 201 is connected to the first bracket 203, and the second end of the telescopic shaft is connected to the second bracket 204.

In some embodiments, the controlling, by the processing apparatus, the driving motor of the adjustable mechanism to adjust the interval between the first module and the second module to be the target lens interval may specifically be:

determining a number of moving steps of the driving motor according to the target lens interval; and controlling the driving motor on the adjustable mechanism to move in accordance with the number of the moving steps to adjust the lens interval between the first lens module and the second lens module to be the target lens interval.

The controlling, by the processing apparatus, the driving motor to adjust the lens interval between the first lens module and the second lens module to be the target lens interval may be achieved by determining the number of moving steps of the driving motor and further controlling the driving motor to move a corresponding number of the moving steps.

Optionally, the determining, by the processing apparatus, the number of the moving steps of the driving motor according to the target lens interval may specifically be:

determining a current lens interval of the first lens module and the second lens module;

calculating an interval difference between the target lens interval and the current lens interval; and calculating a quotient between the interval difference and the distance for each moving step of the driving motor, that is the number of the moving steps of the driving motor.

The current lens interval is represented by d, the target lens interval is represented by D, and the distance for each moving step of the driving motor is represented by step. The number of the moving steps S of the driving motor may be calculated by using the following formula:

$$S=(D-d)/\text{step}.$$

In the embodiments of the present disclosure, the driving motor is installed in the adjustable mechanism. The processing apparatus may control the driving motor to achieve the corresponding adjustment of the target lens interval between the first module and the second module, as well as a fast and accurate adjustment of the target lens interval. When the interval between the three-dimensional capturing device and the target capturing object is at different capturing intervals, the interval between the two lens modules in the three-dimensional capturing device can be fast adjusted to be the target lens interval, thereby enlarging the capturing range.

In still another embodiment, the first lens module may include a first lens and a first lens motor connected to the first lens, and the second lens module may include a second lens and a second lens motor connected to the second lens, where the first lens motor operates to adjust an aperture of the first lens, and the second lens motor operates to adjust an aperture of the second lens.

The processing apparatus may be further configured to:

determine a target number of motor steps when the first lens and the second lens are in an optimal focus state; and adjust the first lens motor and the second lens motor respectively to be the target number of the motor steps.

The aperture of the lens is an apparatus used for controlling an amount of lights entering the lens and entering a photosensitive surface in the camera, which is usually located within the lens. The aperture may be connected to a transmission mechanism, the transmission mechanism is connected to the lens motor, and the lens motor may be connected to a focus processor. The focus processor may control the lens motor to drive the transmission mechanism to adjust the aperture, and stop adjusting when the first lens and the second lens are determined to be in the optimal focus state.

Optionally, the first lens motor may perform an auto focus on the first lens, and stop focusing when the first lens reaches the optimal focus state. The second lens motor may perform an auto focus on the second lens, and stop focusing when the second lens reaches the optimal focus state. Herein, the optimal focus state means that the focus is in the best imaging position, and the focus position of the optimal imaging refers to a focus position at which an imaging formed by an electrical signal output by an imaging sensor can be defocused correctly and a clear imaging can be displayed after lights passing through the first lens and received by the imaging sensor.

When the first lens and the second lens are in the optimal focus state, a focal length of the first lens and the second lens may be determined, where the focal length may be represented by f. As a possible implementation manner, when the first lens motor and the second lens motor are in focus, a movement of the first lens motor and the second lens motor may be controlled by the same processing component to achieve the focus thereof.

The auto focus of the first lens motor or the second lens motor may be based on a distance measurement auto focus of measuring a distance between the three-dimensional image capturing device and the target capturing object, which is also referred to as an active autofocus, and may also be based on a focusing detection auto focus of a clear imaging on a focusing screen, which is also referred to as a passive autofocus. These two focusing manners are basic auto focus principle, and any existing auto focus manners may also be applied in the present disclosure which is not described in detail.

In some embodiments, the determining by the processing apparatus the capturing interval between the three-dimensional image capturing device and the target capturing object may specifically be:

determining a target number of the motor steps and a focal length when the first lens and the second lens are in the optimal focus state;

calculating a product of a difference between the target number of the motor steps and a maximum number of the motor steps, a moving distance for each motor step, and a lens magnification;

calculating a sum of the product and the focal length to obtain an image distance; and calculating and obtaining an object distance according to the image distance, the focal length, and a Gaussian imaging formula, and the object distance is the capturing interval between the three-dimensional image capturing device and the target capturing object.

A corresponding lens aperture may be adjusted during the focusing of the first lens motor and the second lens motor. The lens aperture may be adjusted once by every moving step of the first lens motor and the second lens. By moving the corresponding target number of the motor steps, the optimal focus state may be achieved.

A maximum number of the motor steps may be a maximum number of moveable steps corresponding to the first lens motor and the second lens motor when the capturing interval is infinite, that is, the maximum number of moveable steps the aperture can move.

The image distance q may be calculated by the following formula:

$$q=(Y-X)*t*M+f$$

Where, X represents the maximum number of motor steps, Y represents the target number of the motor steps, t represents a moving distance for each motor step, that is, an accuracy corresponding to each motor step of the lens motor, M represents a lens magnification, and f is the focal length. Where, the moving distance of each motor step and the lens magnification are parameters of the first lens module and the second lens module. When a type or a version of the first lens module and the second lens module is determined, the corresponding parameter thereof can be determined. A corresponding parameter changes as the change of the type or version, when the first lens module and the second lens module belong to the same type or version.

The Gaussian imaging formula is: $1/p+1/q=1/f$, where q is the image distance, and f is the focal length. When q and f are known, the object distance p may be calculated by the present formula. The object distance p is the capturing interval between the three-dimensional image capturing device and the target capturing object.

In the embodiments of the present disclosure, the first lens module and the second lens module may achieve auto focus through the first lens motor and the second lens motor respectively. After the auto focus, the three-dimensional image capturing device may capture a three-dimensional image of the target capturing object by using the first lens module and the second lens module. The captured three-dimensional image after the auto focus is much clear, and a better user experience is provided. Therefore, a fast and accrue adjustment of the lens range may be achieved by adjusting the capturing interval, a capturing adjustment operation of the three-dimensional image may be achieved quickly, and an enlarged capturing arrange is achieved.

Figure 3:
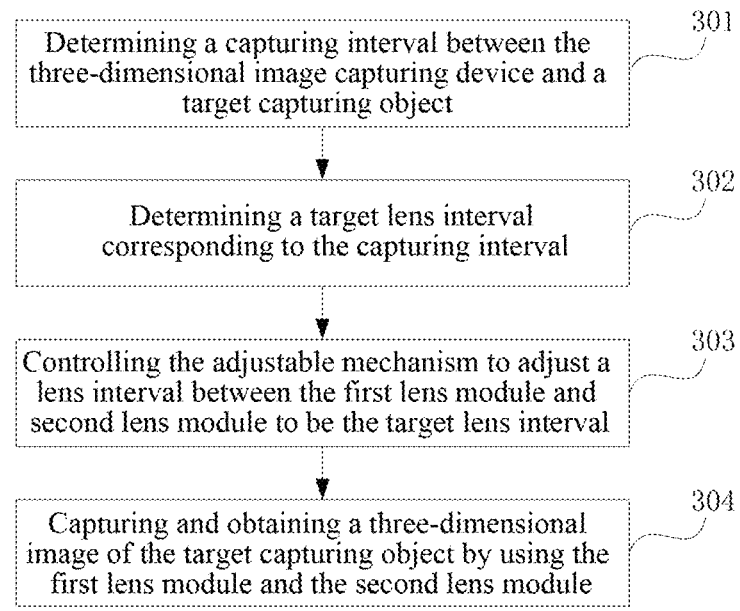
FIG. 3 is a flow chart of a three-dimensional image capturing method according to an embodiment of the present disclosure.

FIG. 3 shows a flow chart of an embodiment of a three-dimensional image capturing method according to an embodiment of the present disclosure, which id mainly applied in the three-dimensional image capturing device.

The method may include:

301: determining a capturing interval between the three-dimensional image capturing device and a target capturing object.

302: determining a target lens interval corresponding to the capturing interval.

303: controlling the adjustable mechanism to adjust a lens interval between the first lens module and the second lens module to be the target lens interval.

Herein, the first lens module and the second lens module are respectively connected to the adjustable mechanism, to adjust a lens interval between the first lens module and the second lens module through the adjustable mechanism.

304: capturing and obtaining a three-dimensional image of the target capturing object by using the first lens module and the second lens module.

The adjustable mechanism may be implemented in various implementation manners. As a possible implementation manner, the adjustable mechanism may be a telescopic apparatus, and the length of the telescopic apparatus may change accordingly. The telescopic mechanism may include a first panel, a second panel connected to the first panel, and an elastic assembly. A first surface of the first panel is provided with a first groove, a first end of the elastic assembly is connected at a first position of the first groove. A first surface of the second panel is provided with a second groove, and a second end of the elastic assembly is connected at a second position of the second groove, where the first surface of the first panel is opposite to the second surface of the second panel. When the elastic assembly is stretched, the length of the telescopic mechanism becomes longer, and thus a lens interval between the first lens module and the second lens module increases. When the elastic assembly is compressed, the length of the telescopic mechanism becomes shortened, and thus the lens interval between the first lens module and the second lens module decreases.

Optionally, the three-dimensional image capturing device may further include: a distance detection component. The determining, by the processing apparatus, the capturing interval between the three-dimensional image capturing device and the target capturing object may specifically be measuring the capturing interval between the three-dimensional image capturing device and the target object by the distance detection component of the three-dimensional image capturing device. The distance detection component may include an infrared range finder or an ultrasonic range finder.

Optionally, the infrared range finder may be installed in the three-dimensional image capturing device, and may include an infrared emitter and an infrared sensor, where the infrared emitter is configured to emit infrared rays as a distance measurement light source, the distance measurement light source is reflected by the target capturing object and then received by the infrared sensor. A processor of the infrared range finder may calculate the capturing interval between the three-dimensional image capturing device and the target capturing object according to a value such as the power of the received distance measurement light source.

Optionally, the ultrasonic range finder may be installed in the three-dimensional image capturing device, and may include an ultrasonic emitting apparatus and an ultrasonic receiving apparatus, where the ultrasonic emitting apparatus may emit continuous ultrasonic waves, which are reflected by the target capturing object after reached the target capturing object, and the reflected ultrasonic waves may be received by the ultrasonic receiving apparatus, so that ultrasonic range finder may determine the capturing interval between the three-dimensional image capturing device and the target capturing object according to a parameter such as a round trip time of the ultrasonic waves.

Optionally, the determining by the processing apparatuses the target lens interval corresponding to the capturing interval may be calculated and obtained specifically by using $D=\alpha(p/10)$.

Where D is the target lens interval, P is the capturing interval, 10 is an estimated ratio between the capturing interval and the target lens interval, and $\alpha$ is a constant less than 1 and greater than 0. In practical applications, a value of $\alpha$ may be determined as needed. Since the optical angle $\theta$ formed between the two camera lenses of the three-dimensional image capturing device and the target object is between 0.72 degrees and 0.8 degrees, that is, the optimal viewing angle is 0.72 degrees to 0.8 degrees. When the lens interval is 0.7 cm, the optimal viewing range may be estimated as 0.7 m (meter) to 5 m (meter) regarding this lens interval. Therefore, the ratio between the capturing interval and the target lens interval may be estimated to be 10:1 by above manner. However, since the optimal viewing range may change correspondingly when the lens interval is determined, a constant $\alpha$ may be used to identify a range mapping relationship between the lens interval and the capturing interval.

Optionally, the first lens module may at least include a first lens, and the second lens module may at least include a second lens. The first lens and the second lens may be the same type of lens. As a possible implementation manner, the first lens and the second lens may be a wide-angle fisheye lens, where the wide-angle refers to a shooting angle of the fisheye lens is wider compared to a shooting angle of a general lens, which may ensure a view image with a larger range can be shot.

The capturing and obtaining, by the processing apparatus, a three-dimensional image of the capturing target using the first lens module and the second lens module may specifically be:

capturing a first image by using the first lens module;

capturing a second image by using the second lens module; and synthesizing the first image captured by the first lens module and the second image captured by the second lens module into the three-dimensional image of the shooting target.

In the embodiments of the present disclosure, the lens interval between the first lens module and the second lens module may be adjusted by the adjustable mechanism to determine the capturing interval between the three-dimensional image capturing device and the target lens interval. The corresponding target lens interval can be determined according to the capturing interval, so as to control the adjustable mechanism to adjust the lens interval between the first lens module and the second lens module to be the target lens interval. The three-dimensional image of the target capturing object may be captured by using the first lens module and the second lens module thereby. Any capturing interval between the three-dimensional image capturing device and the target capturing object can generate a corresponding target lens interval, thereby achieving the capturing of the three-dimensional image. Then the capturing range of the three-dimensional image capturing device can be enlarged, and clear and stable images can be captured in different capturing intervals.

Figure 4:
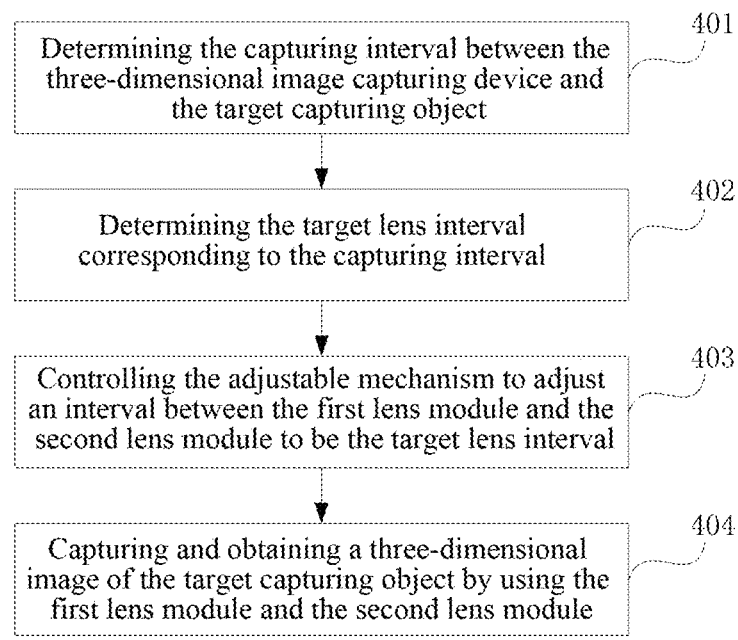
FIG. 4 is a flowchart of a three-dimensional image capturing method according to another embodiment of the present disclosure.

FIG. 4 shows a flowchart of another embodiment of a three-dimensional image capturing method according to an embodiment of the present disclosure. The method may include the following steps:

401: determining the capturing interval between the three-dimensional image capturing device and the target capturing object.

402: determining the target lens interval corresponding to the capturing interval.

403: controlling the adjustable mechanism to adjust a lens interval between the first lens module and the second lens module to be the target lens interval.

Where the first lens module and the second lens module are connected to the adjustable mechanism respectively, to adjust the lens interval between the first lens module and the second lens module by the adjustable mechanism. The drive motor is located on the adjustable mechanism, and is connected to the process apparatus.

404: capturing and obtaining a three-dimensional image of the target capturing object by using the first lens module and the second lens module.

The adjusting by the adjustable mechanism a lens interval between the first lens module and the second lens module may be achieved by the driving motor. That is to say the driving motor may adjust the lens interval between the first lens module and the second lens module under the control of the processing apparatus.

Optionally, the controlling by the processing apparatus the adjustable mechanism to adjust the interval between the first module and the second module to be the target lens interval may include:

controlling the driving motor in the adjustable mechanism to adjust the interval between the first module and the second module to be the target lens interval.

The driving motor is connected to the processing apparatus to receive a control command sent by the processing apparatus, and to achieve an adjustment of the lens interval between the first lens module and the second lens module under the control of the processing apparatus.

In some embodiments, the method may further include:

controlling the drive motor to roll on the telescopic shaft to adjust the lens interval between the first lens module and the second lens module.

Where the telescopic shaft and the rolling shaft connected to the telescopic shaft are located in the drive motor, a first end of the telescopic shaft is connected to a first bracket of the adjustable mechanism, a second end of the telescopic shaft is connected to a second bracket of the adjustable mechanism, the first bracket is connected to the first lens module and the second bracket is connected to the second lens module.

A telescopic shaft may be included in the driving motor, and a length of the telescopic shaft may be changed. When the rolling shaft rolls on the telescopic shaft, the length of the telescopic shaft may be changed. As a possible implementation manner, the telescopic shaft and the rolling shaft may be connected by a way of a sawtooth, and the length of the telescopic shaft may be changed by rotating the rolling shaft on the telescopic shaft.

When the length of the telescopic shaft changes, the interval between the first bracket and the second bracket changes accordingly. A distance between the first lens module connected to the first bracket and the second lens module connected to the second bracket changes as the change of the distance between the two brackets, to achieve a adjustment of the lens interval between the first lens module and the second lens module. The first bracket and the second bracket are both apparatuses used for carrying or connecting the first lens module and the second lens module.

In some embodiments, the controlling by the processing apparatus the driving motor of the adjustable mechanism to adjust the interval between the first module and the second module to be the target lens interval may include:

determining a number of moving steps of the driving motor according to the target lens interval; and controlling the driving motor on the adjustable mechanism to move in accordance with the number of the moving steps to adjust the lens interval between the first lens module and the second lens module to be the target lens interval.

The controlling by the processing apparatus the driving motor to adjust the lens interval between the first lens module and the second lens module to be the target lens interval may be achieved by determining the number of the moving steps of the driving motor and further controlling the driving motor to move a corresponding number of moving steps.

Optionally, the determining by the processing apparatus the number of the moving steps of the driving motor according to the target lens interval may include:

determining a current lens interval of the first lens module and the second lens module;

calculating an interval difference between the target lens interval and the current lens interval; and calculating a quotient between the interval difference and the distance for each moving step of the driving motor, that is the number of the moving steps of the driving motor.

The current lens interval is represented by d, the target lens interval is represented by D, and the distance for each moving step of the driving motor is represented by step. The moving step of the driving motor S may be calculated by using the following formula:

$$S=(D-d)/\text{step}.$$

In the embodiments of the present disclosure, the driving motor is installed in the adjustable mechanism. The processing apparatus may control the driving motor to achieve the corresponding adjustment of the target lens interval between the first module and the second module, as well as a fast and accurate adjustment of the target lens interval. When the interval between the three-dimensional capturing device and the target capturing object is at different capturing intervals, the interval between the two lens modules in the three-dimensional capturing device can be fast adjusted to be the target lens interval, thereby enlarging the capturing range.

In still another embodiment, the method may further include:

determining a target number of the motor steps when the first lens and the second lens are in an optimal focus state; and adjusting the first lens motor and the second lens motor respectively to the target number of the motor steps.

Where the first lens motor and the first lens are located in the first lens module, the first lens motor operates to adjust an aperture of the first lens, the second lens motor and the second lens are located in the second lens module, and the second lens motor operates to adjust an aperture of the second lens.

The aperture of the lens is an apparatus used for controlling an amount of lights entering the lens and entering a photosensitive surface in the camera, which is usually located within the lens. The aperture may be connected to a transmission mechanism, the transmission mechanism is connected to the lens motor, and the lens motor may be connected to a focus processor. The focus processor may control the lens motor to drive the transmission mechanism to adjust the aperture, and stop adjusting when the first lens and the second lens are determined to be in the optimal focus state.

Optionally, the first lens motor may perform an auto focus on the first lens, and stop focusing when the first lens reaches the optimal focus state. The second lens motor may perform an auto focus on the second lens, and stop focusing when the second lens reaches the optimal focus state. Herein, the optimal focus state means that the focus is in the best imaging position, and the focus position of the optimal imaging refers to a focus position at which an imaging formed by an electrical signal output by an imaging sensor can be defocused correctly and a clear imaging can be displayed after lights passing through the first lens and received by the imaging sensor.

When the first lens and the second lens are in the optimal focus state, a focal length of the first lens and the second lens may be determined, where the focal length may be represented by f. As a possible implementation manner, when the first lens motor and the second lens motor are in focus, a movement of the first lens motor and the second lens motor may be controlled by the same processing component to achieve the focus thereof.

The auto focus of the first lens motor or the second lens motor may be based on a distance measurement auto focus of measuring a distance between the three-dimensional image capturing device and the target capturing object, which is also referred to as an active autofocus, and may also be based on a focusing detection auto focus of a clear imaging on a focusing screen, which is also referred to as a passive autofocus. These two focusing manners are basic auto focus principle, and any existing auto focus manners may also be applied in the present disclosure which is not described in detail.

In some embodiments, the determining the capturing interval between the three-dimensional image capturing device and the target capturing object may include:

determining a target number of the motor steps and a focal length when the first lens and the second lens are in the optimal focus state;

calculating a product of a difference between the target number of the motor steps and a maximum number of the motor steps, a moving distance for each motor step, and a lens magnification;

calculating a sum of the product and the focal length to obtain an image distance; and calculating and obtaining an object distance according to the image distance, the focal length, and a Gaussian imaging formula, and the object distance is the capturing interval between the three-dimensional image capturing device and the target capturing object.

A corresponding lens aperture may be adjusted during the focusing of the first lens motor and the second lens motor. The lens aperture may be adjusted once by every moving step of the first lens motor and the second lens. By moving the corresponding target number of the motor steps, the optimal focus state may be achieved.

A maximum number of the motor steps may be a maximum number of moveable steps corresponding to the first lens motor and the second lens motor when the capturing interval is infinite, that is, the maximum number of moveable steps the aperture can move.

The image distance q may be calculated by the following formula:

$$q=(Y-X)*t*M+f$$

Where, X represents the maximum number of the motor steps, Y represents the target number of the motor steps, t represents a moving distance for each motor step, that is, an accuracy corresponding to each motor step of the lens motor, M represents a lens magnification, and f is the focal length. Where, the moving distance of each motor step and the lens magnification are parameters of the first lens module and the second lens module. When a type or a version of the first lens module and the second lens module is determined, the corresponding parameter thereof can be determined. A corresponding parameter changes as the change of the type or version, when the first lens module and the second lens module belong to the same type or version.

The Gaussian imaging formula is: $1/p+1/q=1/f$, where q is the image distance, and f is the focal length. When q and f are known, the object distance p may be calculated by the present formula. The object distance p is the capturing interval between the three-dimensional image capturing device and the target capturing object.

In the embodiment of the present disclosure, the first lens module and the second lens module may achieve auto focus through the first lens motor and the second lens motor respectively. After the auto focus, the three-dimensional image capturing device may capture a three-dimensional image regarding the target capturing object by using the first lens module and the second lens module. The captured three-dimensional image after the auto focus is much clear, and a better user experience is provided. Therefore, a fast and accrue adjustment of the lens range may be achieved by adjusting the capturing interval, a capturing adjustment operation of the three-dimensional image may be achieved quickly, and an enlarged capturing arrange is achieved.

Figure 5:
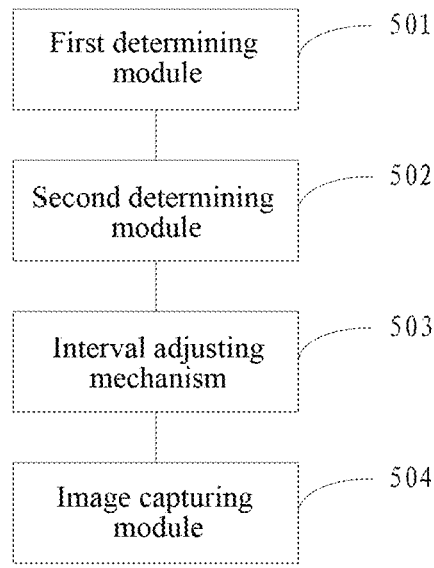
FIG. 5 is a schematic diagram of a structure of a three-dimensional image capturing device according to an embodiment of the present disclosure.

FIG. 5 shows a schematic structural diagram of an embodiment of a three-dimensional image capturing device according to an embodiment of the present disclosure. The apparatus may include:

a first determining module 501 configured to determine a capturing interval between the three-dimensional image capturing device and a target capturing object;

a second determining module 502 configured to determine a target lens interval corresponding to the capturing interval;

an interval adjusting mechanism 503 configured to control the adjustable mechanism to adjust a lens interval between the first lens module and the second lens module to be the target lens interval;

herein, the first lens module and the second lens module are respectively connected to the adjustable mechanism, to adjust the lens interval between the first lens module and the second lens module through the adjustable mechanism; and an image capturing module 504 configured to capture and obtain a three-dimensional image of the target capturing object by using the first lens module and the second lens module.

The adjustable mechanism may be implemented in various implementation manners. As a possible implementation manner, the adjustable mechanism may be a telescopic apparatus, and the length of the telescopic apparatus may change accordingly. The telescopic mechanism may include a first panel, a second panel connected to the first panel, and an elastic assembly. A first surface of the first panel is provided with a first groove, a first end of the elastic assembly is connected at a first position of the first groove. A first surface of the second panel is provided with a second groove, and a second end of the elastic assembly is connected at a second position of the second groove, where the first surface of the first panel is opposite to the second surface of the second panel. When the elastic assembly is stretched, the length of the telescopic mechanism becomes longer, and thus a lens interval between the first lens module and the second lens module increases. When the elastic assembly is compressed, the length of the telescopic mechanism becomes shortened, and thus the lens interval between the first lens module and the second lens module decreases.

Optionally, the three-dimensional image capturing device may include: a distance detection component. The first determining module may be configured to measure the capturing interval between the three-dimensional image capturing device and the target object by the distance detection component of the three-dimensional image capturing device. The distance detection component may include an infrared range finder or an ultrasonic range finder.

Optionally, the infrared range finder may be installed in the three-dimensional image capturing device, and may include an infrared emitter and an infrared sensor, where the infrared emitter is configured to emit infrared rays as a distance measurement light source, the distance measurement light source is reflected by the target capturing object and the received by the infrared sensor. A processor of the infrared range finder may calculate the capturing interval between the three-dimensional image capturing device and the target capturing object according to a value such as the power of the received distance measurement light source.

Optionally, the ultrasonic range finder may be installed in the three-dimensional image capturing device, and may include an ultrasonic emitting apparatus and an ultrasonic receiving apparatus, where the ultrasonic emitting apparatus may emit continuous ultrasonic waves, which are reflected by the target capturing object after reached the target capturing object, and the reflected ultrasonic waves may be received by the ultrasonic receiving apparatus, so that ultrasonic range finder may determine the capturing interval between the three-dimensional image capturing device and the target capturing object according to a parameter such as a round trip time of the ultrasonic waves.

Optionally, the determining by the processing apparatuses the target lens interval corresponding to the capturing interval may be calculated and obtained specifically by using $D=\alpha(p/10)$.

Where D is the target lens interval, P is the capturing interval, 10 is an estimated ratio between the capturing interval and the target lens interval, and $\alpha$ is a constant less than 1 and greater than 0. In practical applications, a value of $\alpha$ may be determined as needed. Since the optical angle $\theta$ formed between the two camera lenses of the three-dimensional image capturing device and the target object is between 0.72 degrees and 0.8 degrees, that is, the optimal viewing angle is 0.72 degrees to 0.8 degrees. When the lens interval is 0.7 cm, the optimal viewing range may be estimated as 0.7 m (meter) to 5 m (meter) regarding this lens interval. Therefore, the ratio between the capturing interval and the target lens interval may be estimated to be 10:1 by above manner. However, since the optimal viewing range may change correspondingly when the lens interval is determined, a constant $\alpha$ may be used to identify a range mapping relationship between the lens interval and the capturing interval.

Optionally, the first lens module may at least include a first lens, and the second lens module 103 may at least include a second lens. The first lens and the second lens may be the same type of lens. As a possible implementation manner, the first lens and the second lens may be a wide-angle fisheye lens, where the wide-angle refers to a shooting angle of the fisheye lens is wider compared to a shooting angle of a general lens, which may ensure a view image with a larger range can be shot.

The image capturing module may be configured to:
capture a first image by using the first lens module;
capture a second image by using the second lens module; and
synthesize the first image captured by the first lens module and the second image captured by the second lens module into the three-dimensional image of the shooting target.

In the embodiments of the present disclosure, the lens interval between the first lens module and the second lens module may be adjusted by the adjustable mechanism to determine the capturing interval between the three-dimensional image capturing device and the target lens interval. The corresponding target lens interval can be determined according to the capturing interval, so as to control the adjustable mechanism to adjust the lens interval between the first lens module and the second lens module to be the target lens interval. The three-dimensional image of the target capturing object may be captured by using the first lens module and the second lens module thereby. Any capturing interval between the three-dimensional image capturing device and the target capturing object can generate a corresponding target lens interval, thereby achieving the capturing of the three-dimensional image. Then the capturing range of the three-dimensional image capturing device can be enlarged, and clear and stable images can be captured in different capturing intervals.

As an embodiment, the distance adjusting module may include:
a first adjusting unit configured to control the drive motor of the adjustable mechanism to adjust the interval between the first lens module and the second lens module, where the drive motor is located on the adjustable mechanism, and is connected to the processing apparatus.

The adjusting by the adjustable mechanism a lens interval between the first lens module and the second lens module may be achieved by the driving motor. That is to say the driving motor may adjust the lens interval between the first lens module and the second lens module under the control of the processing apparatus.

Optionally, the interval adjusting module may include:
a second adjusting unit configured to control the driving motor in the adjustable mechanism to adjust the interval between the first module and the second module to be the target lens interval.

The driving motor is connected to the processing apparatus to receive a control command sent by the processing apparatus, and to adjust the lens interval between the first lens module and the second lens module under the control of the processing apparatus.

In some embodiments, the apparatus may include:

a motor adjusting module, configured to control a rolling shaft of the drive motor to roll on a telescopic shaft, to adjust a lens interval between the first lens module and the second lens module.

Where the telescopic shaft and the rolling shaft connected to the telescopic shaft are located in the drive motor, a first end of the telescopic shaft is connected to the first bracket, a second end of the telescopic shaft is connected to a second bracket, the first bracket is connected to the first lens module and the second bracket is connected to the second lens module.

In the driving motor, a telescopic shaft may be included, and a length of the telescopic shaft may change. When the rolling shaft rolls on the telescopic shaft, the length of the telescopic shaft may be changed. As a possible implementation manner, the telescopic shaft and the rolling shaft may be connected by a way of a sawtooth, and the length of the telescopic shaft may be changed by rotating the rolling shaft on the telescopic shaft.

The interval between the first bracket and the second bracket changes accordingly, when the length of the telescopic shaft changes. A distance between the first lens module connected to the first bracket and the second lens module connected to the second bracket changes as the change of the distance between the brackets thereby, to achieve an adjustment of the lens interval between the first lens module and the second lens module. The first bracket and the second bracket are apparatuses both used for carrying or connecting the first lens module and the second lens module.

In some embodiments, the interval adjusting module may include:

a step determining unit, configured to determine a number of moving steps of the drive motor; and a step adjusting unit, configured to control the drive motor on the adjustable mechanism to move in accordance with the number of the moving steps, to adjust the lens interval between the first lens module and the second lens module to be the target lens interval.

The controlling by the processing apparatus the driving motor to adjust the lens interval between the first lens module and the second lens module to be the target lens interval may be achieved by determining the number of the moving steps of the driving motor and further controlling the driving motor to move a corresponding number of moving steps.

Optionally, the step determining unit may be configured to:

determine a current lens interval of the first lens module and the second lens module;

calculate an interval difference between the target lens interval and the current lens interval; and calculate a quotient between the interval difference and the distance for each moving step of the driving motor, that is the number of the moving steps of the driving motor.

The current lens interval is represented by d, the target lens interval is represented by D, and the distance for each moving step of the driving motor is represented by step. The number of the moving step S of the driving motor may be calculated by using the following formula:

$$S=(D-d)/\text{step}.$$

In the embodiments of the present disclosure, the driving motor is installed in the adjustable mechanism. The processing apparatus may control the driving motor to achieve the corresponding adjustment of the target lens interval between the first module and the second module, as well as a fast and accurate adjustment of the target lens interval. When the interval between the three-dimensional capturing device and the target capturing object is at different capturing intervals, the interval between the two lens modules in the three-dimensional capturing device can be fast adjusted to be the target lens interval, thereby enlarging the capturing range.

As still another embodiment, the apparatus may further include:

a focus step module, configured to determine a target number of the motor steps when the first lens and the second lens are in an optimal focus state; and a focus adjusting module, configured to adjust the first lens motor and the second lens motor respectively to be the target number of the motor steps.

Where the first lens motor and the first lens are located on the first lens module, the first lens motor operates to adjust an aperture of the first lens, the second lens motor and the second lens are located on the second lens module, the second lens motor operates to adjust an aperture of the second lens.

The aperture of the lens is an apparatus used for controlling an amount of lights entering the lens and entering a photosensitive surface in the camera, which is usually located within the lens. The aperture may be connected to a transmission mechanism, the transmission mechanism is connected to the lens motor, and the lens motor may be connected to a focus processor. The focus processor may control the lens motor to drive the transmission mechanism to adjust the aperture, and stop adjusting when the first lens and the second lens are determined to be in the optimal focus state.

Optionally, the first lens motor may perform an auto focus on the first lens, and stop focusing when the first lens reaches the optimal focus state. The second lens motor may perform an auto focus on the second lens, and stop focusing when the second lens reaches the optimal focus state. Herein, the optimal focus state means that the focus is in the best imaging position, and the focus position of the optimal imaging refers to a focus position at which an imaging formed by an electrical signal output by an imaging sensor can be defocused correctly and a clear imaging can be displayed after lights passing through the first lens and received by the imaging sensor.

When the first lens and the second lens are in the optimal focus state, a focal length of the first lens and the second lens may be determined, where the focal length may be represented by f. As a possible implementation manner, when the first lens motor and the second lens motor are in focus, a movement of the first lens motor and the second lens motor may be controlled by the same processing component to achieve the focus thereof.

The auto focus of the first lens motor or the second lens motor may be based on a distance measurement auto focus of measuring a distance between the three-dimensional image capturing device and the target capturing object, which is also referred to as an active autofocus, and may also be based on a focusing detection auto focus of a clear imaging on a focusing screen, which is also referred to as a passive autofocus. These two focusing manners are basic auto focus principle, and any existing auto focus manners may also be applied in the present disclosure which is not described in detail.

In some embodiments, the first determining module may include:

a first determining unit, configured to a target number of the motor steps and a focal length when the first lens and the second lens are in the optimal focus state;

a first calculating unit, configured to calculate a product of a difference between the target number of the motor steps and a maximum number of the motor steps, a moving distance for each motor step, and a lens magnification;

a second calculating unit, configured to calculate a sum of the product and the focal length to obtain an image distance; and a third calculating unit, configured to calculate and obtain an object distance according to the image distance, the focal length, and a Gaussian imaging formula, and the object distance is the capturing interval between the three-dimensional image capturing device and the target capturing object.

A corresponding lens aperture may be adjusted during the focusing of the first lens motor and the second lens motor. The lens aperture may be adjusted once by every moving step of the first lens motor and the second lens. By moving the corresponding target number of the motor steps, the optimal focus state may be achieved.

A maximum number of the motor steps may be a maximum number of moveable steps corresponding to the first lens motor and the second lens motor when the capturing interval is infinite, that is, the maximum number of moveable steps the aperture can move.

The image distance q may be calculated by the following formula:

$$q=(Y-X)*t*M+f$$

Where, X represents the maximum number of motor steps, Y represents the target number of the motor steps, t represents a moving distance for each motor step, that is, an accuracy corresponding to each motor step of the lens motor, M represents a lens magnification, and f is the focal length. Where, the moving distance of each motor step and the lens magnification are parameters of the first lens module and the second lens module. When a type or a version of the first lens module and the second lens module is determined, the corresponding parameter thereof can be determined. A corresponding parameter changes as the change of the type or version, when the first lens module and the second lens module belong to the same type or version.

The Gaussian imaging formula is: $1/p+1/q=1/f$, where q is the image distance, and f is the focal length. When q and f are known, the object distance p may be calculated by the present formula. The object distance p is the capturing interval between the three-dimensional image capturing device and the target capturing object.

In the embodiments of the present disclosure, the first lens module and the second lens module may achieve auto focus through the first lens motor and the second lens motor respectively. After the auto focus, the three-dimensional image capturing device may capture a three-dimensional image of the target capturing object by using the first lens module and the second lens module. The captured three-dimensional image after the auto focus is much clear, and a better user experience is provided. Therefore, a fast and accrue adjustment of the lens range may be achieved by adjusting the capturing interval, a capturing adjustment operation of the three-dimensional image may be achieved quickly, and an enlarged capturing arrange is achieved.

In a typical configuration, a computing device includes one or more processors (CPUs), an input/output interface, a network interface, and a memory.

The memory may include a non-permanent memory, a random access memory (RAM), and/or a non-volatile memory in a computer-readable medium, such as a read-only memory (ROM) or a flash RAM. The memory is an example of a computer-readable medium.

The computer-readable medium includes permanent and non-permanent, mobile and non-mobile media, which may implement information storage by any method or technology. The information may be a computer-readable instruction, a data structure, a program module, or other data. Examples of computer storage media include, but are not limited to, a phase change RAM (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disk (DVD) or other optical memories, a magnetic tape cartridge, a magnetic tape storage device or other magnetic storage devices or any other non-transmission media, which may be used to store information accessible by a computing device. As defined herein, the computer-readable medium does not include non-transitory computer-readable media such as modulated data signals and carrier waves.

Certain terms are used throughout the description and claims to refer to particular components. Those skilled in the art will understand that hardware manufacturers may call the same component by different nouns. The present description and claims do not use a name difference as a mode for distinguishing the components, but the functional difference of the components is taken as a criterion for distinguishing. The word "comprising" as used throughout the description and claims is an open term and should be interpreted as "comprising but not limited to". "Substantially" means that within an acceptable error range, those skilled in the art will be able to solve the technical problems within a certain error range, basically achieving the technical effects. In addition, the term "coupled" is used herein to include any direct and indirect electrical coupling means. Therefore, if it is described here that a first apparatus is coupled to a second apparatus, it is indicated that the first apparatus may be directly and electrically coupled to the second apparatus or indirectly and electrically coupled to the second apparatus through other apparatuses or coupling means. The description is described as an implementation mode for implementing the present disclosure. However, the description is intended to be illustrative of the general principle of the present disclosure, and is not intended to limit the scope of the present disclosure. The scope of protection of the present disclosure is subject to the definition of the appended claims.

It should also be noted that the terms "including", "containing" or any other variations thereof are intended to encompass a non-exclusive inclusion, such that the item or system including a series of elements includes not only those elements but also other elements not explicitly listed, or elements that are inherent to such item or system. In the absence of more restrictions, an element defined by the phrase "including one . . . " does not exclude the existence of additional identical elements in the item or system that includes the element.

The above description shows and describes several exemplary embodiments of the present disclosure, but as described above, it should be understood that the present disclosure is not limited to the forms disclosed herein, which should not be construed as exclusion of other embodiments, but can be applied to various other combinations, modifications, and environments, and can be modified by the above teachings or related art or knowledge within the scope of the application concept described herein. All modifications and changes made by those skilled in the art without departing from the spirit and scope of the present disclosure shall fall within the protection scope of the appended claims of the present disclosure.

What is claimed is:

1. A three-dimensional image capturing device, comprising a first lens module and a second lens module, and further comprising:

an adjustable mechanism connecting the first lens module and the second lens module respectively; and a processing apparatus connected to the first lens module and the second lens module; wherein the processing apparatus is for, during an image capturing process, determining a capturing interval between the three-dimensional image capturing device and a target capturing object, determining a target lens interval according to the capturing interval, controlling the adjustable mechanism to adjust a module interval between the first lens module and the second lens module to be the target lens interval and to keep optical angles formed between the target capturing object and the first lens module and the second lens module unchanged, and capturing and obtaining a three-dimensional of the target capturing object by using the first lens module and the second lens module after the module interval is adjusted to the target lens interval.

2. The device according to claim 1, further comprising: a driving motor mounted on the adjustable mechanism and connected to the processing apparatus; wherein the driving motor is for adjusting the module interval between the first lens module and the second lens module through the adjustable mechanism to be the target lens interval under a control of the processing apparatus.

3. The device according to claim 2, wherein the driving motor comprises a telescopic shaft, and a rolling shaft connected to the telescopic shaft; the adjustable mechanism further comprises a first bracket connected to a first end of the telescopic shaft, and a second bracket connected to a second end of the telescopic shaft; wherein the first bracket is connected to the first lens module, and the second bracket is connected to the second lens module; and the rolling shaft is further connected to the processing apparatus to cause the processing apparatus to control the rolling shaft to roll on the telescopic shaft, to change the module interval between the first lens module and the second lens module.

4. The device according to claim 2, wherein the processing apparatus controls the driving motor of the adjustable mechanism to adjust the module interval between the first lens module and the second lens module to be the target lens interval comprises:

determining a number of moving steps of the driving motor according to the target lens interval; and controlling the driving motor on the adjustable mechanism to move according to the moving steps, to adjust the module interval between the first lens module and the second lens module to be the target lens interval.

5. The device according to claim 1, wherein:

the first lens module comprises a first lens and a first lens motor connected to the first lens, and the second lens module comprises a second lens and a second lens motor connected to the second lens;

the first lens motor is operated to adjust an aperture of the first lens;

the second lens motor is operated to adjust an aperture of the second lens; and the processing apparatus is for:

determining a target number of the motor steps when the first lens and the second lens are in an optimal focus state; and adjusting the first lens motor and the second lens motor to be the target number of the motor steps respectively.

6. The device according to claim 5, wherein the determining by the processing apparatus the capturing interval between the three-dimensional image capturing device and the target capturing object comprises:

determining the target number of the motor steps and a focal length when the first lens and the second lens are in the optimal focus state;

calculating a product of a difference between the target number of the motor steps and a maximum number of the motor steps, a moving distance for each motor step, and a lens magnification;

calculating a sum of the product and the focal length to obtain an image distance; and calculating and obtaining an object distance according to the image distance, the focal length, and a Gaussian imaging formula, wherein the object distance is the capturing interval between the three-dimensional image capturing device and the target capturing object.

7. A three-dimensional image capturing method, applied in a three-dimensional image capturing device, comprising:

determining a capturing interval between the three-dimensional image capturing device and a target capturing object;

determining a target lens interval according to the capturing interval;

during an image capturing process, controlling an adjustable mechanism to adjust a module interval between a first lens module and a second lens module to be the target lens interval; wherein the first lens module and the second lens module are respectively connected to the adjustable mechanism, to adjust a module interval between the first lens module and the second lens module through the adjustable mechanism to be the target lens interval and to keep optical angles formed between the target capturing object and the first lens module and the second lens module unchanged; and capturing a three-dimensional image of the target capturing object by using the first lens module and the second lens module.

8. The method according to claim 7, wherein the controlling the adjustable mechanism to adjust the module interval between the first lens module and the second lens module to be the target lens interval comprises:

controlling a driving motor of the adjustable mechanism to adjust the module interval between the first lens module and the second lens module to be the target lens interval; wherein the driving motor is located on the adjustable mechanism and is connected to the processing apparatus.

9. The method according to claim 8, wherein the method further comprises:

controlling a rolling shaft of the driving motor to roll on a telescopic shaft to change the module interval between the first lens module and the second lens module; wherein the telescopic shaft and the rolling shaft connected to the telescopic shaft are both located in the driving motor, a first end of the telescopic shaft is connected to a first bracket of the adjustable mechanism, and a second end of the telescopic shaft is connected to a second bracket of the adjustable mechanism; and the first bracket is connected to the first lens module, and the second bracket is connected to the second lens module.

10. The method according to claim 8, wherein the controlling the driving motor of the adjustable mechanism to adjust the module interval between the first lens module and the second lens module to be the target lens interval comprises:

determining a number of moving steps of the driving motor according to the target lens interval; and controlling the driving motor on the adjustable mechanism to move in accordance with the number of the moving steps to adjust the module interval between the first lens module and the second lens module to be the target lens interval.

11. The method according to claim 7, wherein the method further comprises:

determining a target number of motor steps when the first lens and the second lens are in an optimal focus state; and adjusting the first lens motor and the second lens motor respectively to be the target number of the motor steps;

wherein the first lens motor and the first lens are located in the first lens module, the first lens motor is operated to adjust an aperture of the first lens, the second lens motor and the second lens are located in the second lens module, and the second lens motor is operated to adjust an aperture of the second lens.

12. The method according to claim 11, wherein the determining the capturing interval between the three-dimensional image capturing device and the target capturing object comprises:

determining the target number of the motor steps and a focal length when the first lens and the second lens are in the optimal focus state;

calculating a product of a difference between the target number of the motor steps and a maximum number of motor steps, a moving distance for each motor step, and a lens magnification;

calculating a sum of the product and the focal length to obtain an image distance; and calculating and obtaining an object distance according to the image distance, the focal length, and a Gaussian imaging formula, wherein the object distance is the capturing interval between the three-dimensional image capturing device and the target capturing object.

* * * * *